Nov. 25, 1924.

B. H. WINCHELL

FISHING BAIT

Filed Aug. 18, 1924

1,516,940

INVENTOR.
Benjamin H. Winchell.
BY
ATTORNEY.

Patented Nov. 25, 1924.

1,516,940

UNITED STATES PATENT OFFICE.

BENJAMIN H. WINCHELL, OF CHICAGO, ILLINOIS, ASSIGNOR TO SOUTH BEND BAIT CO., OF SOUTH BEND, INDIANA, A CORPORATION OF INDIANA.

FISHING BAIT.

Application filed August 18, 1924. Serial No. 732,654.

*To all whom it may concern:*

Be it known that I, BENJAMIN H. WINCHELL, a citizen of the United States, residing at Chicago, in the county of Cook and State of Illinois, have invented certain new and useful Improvements in Fishing Baits, of which the following is a specification.

The invention relates to fishing bait, and has for its object to provide means whereby the shank of the hook may be easily and quickly secured in a bait body in a manner whereby the bait body can not move longitudinally on the shank.

A further object is to secure to the shank of the hook in parallel relation thereto, a wire, which wire extends through an angularly disposed eye carried by the hook shank, and to provide one end of said wire with a bend disposed in a slot in one end of the bait body, and the other end of the wire provided with an eye spaced from the other end of the bait body for the reception of a line, said wire adjacent its eye being provided with a spinner adapted to rotate as the bait is drawn through the water.

A further object is to secure the wire to the shank of the hook by means of a spring wire wrapping, the end of which is bent over one end of the bait body and extends to a position adjacent the point of the hook, and forms a guard for preventing the hook from hanging on rocks and the like.

A further object is to form the bait body from a resilient material whereby when the hook shank, wire and wrapping are disposed in the aperture and slot thereof, said resilient body will contractibly grip the same, and the bent portion of the wire will be imbedded in the opposite walls of the slit, thereby additionally preventing longitudinal movement of the bait body on the shank.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 5:
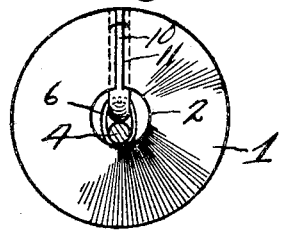
Figure 5 is a sectional view taken on line 5—5 of Figure 3.

Referring to the drawing, the numeral 1 designates the bait body, which body is formed from yieldable or resilient material, for instance rubber and 2 an aperture extending longitudinally therethrough. The hook 3 has its shank 4 disposed in the aperture 2, and an angularly disposed eye 5, which slightly overlies the outer end of the bait body 1 and assists in preventing longitudinal movement of the bait body in one direction. Secured to the shank 4 of the hook by means of a spring wire wrapping 6 is a holding wire 7, which holding wire extends through the eye 5, and is in parallel relation to the shank 4. The wrapping 6 at its outer end terminates in an extension 8 formed from said wrapping, and which extension, after the holding wire 7 and shank 8 have been forced into the aperture 2 of the bait body is bent over the outer end of the bait body, and towards the point 9 of the hook, thereby forming a hook guard for preventing the bait from catching on obstructions, for instance rocks. After the shank 4 and holding wire 7 have been forced through the aperture 2 to position shown in Figure 3, the inner end of the holding wire 7 being bent to form the angularly disposed portion 10 and forced into the slit 11 in the inner end of the bait body, which angularly disposed portion and slit prevent rotation of the bait body as well as preventing longitudinal movement of the bait body in one direction, therefore it will be seen that the bait body is positively held. By forming the bait body 1 of resilient material, it will be seen that the angularly disposed portion 10 will be contractibly imbedded in the opposite walls of the slit 11 as clearly shown in Figure 5, and in which figure the slit is considerably exaggerated to better illustrate the structure. By forming the bait body 1 of contractible material, for instance rubber, it will be seen that the wrapping as well as the angularly disposed portion 10 will be positively gripped. After the device is assembled the bait body may be enameled or otherwise finished, and which finish will close the ends of the aperture 2, as well as the slit 11, consequently the securing parts of the hook will be concealed from view, and will not detract from the appearance of the bait.

Figure 1:
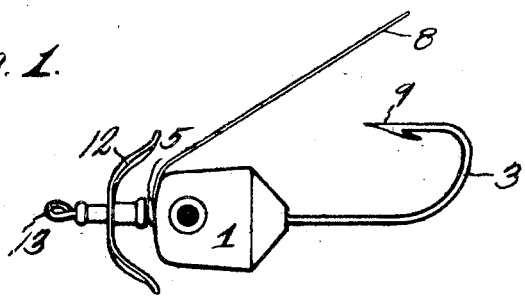
Figure 1 is a side elevation of the bait assembled.
Figure 2:
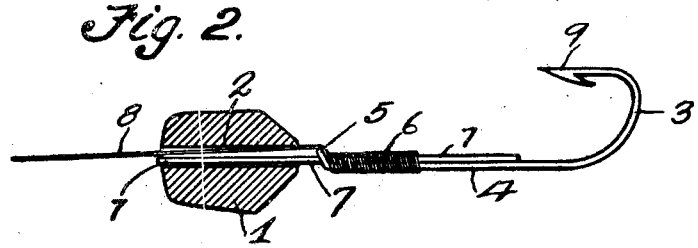
Figure 2 is a longitudinal sectional view through the bait body, showing the holding wire, guard wire and shank of the hook in position to be passed through the bait body.
Figure 3:
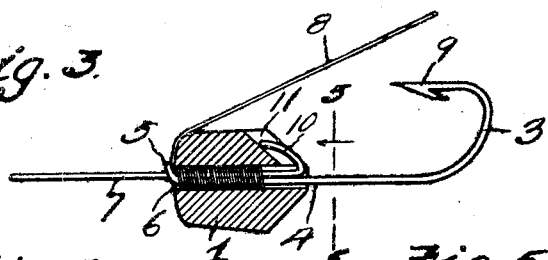
Figure 3 is a vertical sectional view through the bait body, showing the shank of the hook therein, guard wire bent to position and the holding wire in position to receive the spinner.
Figure 4:
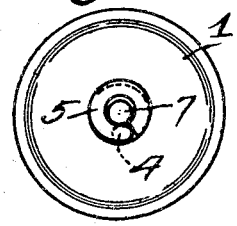
Figure 4 is a view of the outer end of the bait body.

After the device has been assembled as shown in Figure 3, a spinner 12 is placed on the holding wire 7 at its outer end, and then an eye 13 is formed on the outer end of the holding wire, which prevents outward movement of the spinner, and at the same time forms a shoulder against one end of which the outer end of the spinner engages during its rotation. The other end of the spinner engages the eye 5 carried by the hook shank during its rotation, however it will be seen that the eye 5 and guard 8 will prevent the spinner from becoming bound or held by the eyes 13 and 5, during the movement of the bait through the water.

From the above it will be seen that a fish bait is provided, wherein the shank of the bait is securely held against rotation or longitudinal movement in the bait body, and the wrapping used for securing the holding wire to the shank of the hook is provided with an extension which also forms means for holding the bait body against longitudinal movement, and a guard for the point of the hook, and the parts are gripped by the resilient bait body, thereby additionally securing the parts to the bait body and preventing looseness or movement.

The invention having been set forth what is claimed as new and useful is:—

1. A fishing bait comprising a body, a fish hook shank extending therethrough, an eye carried by said fish hook shank at one end of the body, a securing wire extending through said body, said wire being secured to the shank, one end of said wire being provided with an angularly disposed portion disposed in a slot in one end of the body, and means carried by said wire whereby a fish line may be attached thereto.

2. The combination with a fish hook shank, said shank extending through an aperture in a bait body, an eye carried by said shank adjacent one end of the bait body, of means for securing said shank to said bait body, said means comprising a wire secured to the shank and extending through the aperture and the eye of the shank, one end of said wire being provided with a bent portion disposed in a slit in one end of the bait body, and means whereby a fishing line may be attached to said wire.

3. The combination with a fish hook shank, said shank extending through an aperture in a bait body, an angularly disposed eye carried by said shank and engaging one end of the bait body, of means for securing said shank to said body, said means comprising a wire, said wire being secured to the shank and extending through the aperture in the body and the eye carried by the shank, an angularly disposed portion carried by one end of said wire and disposed in a slit in one end of the bait body, a spinner carried by said wire adjacent the other end of the bait body, and means whereby a line may be attached to said wire.

4. A fish hook bait comprising a body member having an aperture therethrough, a fish hook shank disposed in said aperture, an eye carried by said shank adjacent one end of the bait body, a securing wire extending through the aperture, a wire wrapping securing said wire to the shank, said wire extending through the eye of the shank, said wrapping wire extending over one end of the body and forming a hook guard, one end of the securing wire being provided with an angularly disposed portion disposed in a slit of the other end of the body, and means whereby a line may be attached to the securing wire.

5. A fishing bait comprising a fish hook having its shank extending through an aperture in a bait body and provided with an eye adjacent the outer end of the body, a securing wire secured to the shank of the hook and extending through the aperture and eye of the shank, one end of said securing wire being provided with an angularly disposed portion disposed in a slit in one end of the body, and means whereby a line may be attached to the other end of the securing wire.

6. The combination with a fish bait comprising a fish hook having a point, a shank disposed in an aperture of a bait body, an eye carried by said shank adjacent one end of the bait body, of a securing wire extending through said aperture and the eye of the shank, a wire wrapping securing the securing wire to the shank, one end of said wire wrapping terminating in a member overlying the outer end of the bait body and forming a hook guard, the inner end of the securing wire being provided with an angularly disposed portion disposed in a slot in the inner end of the bait body, and means whereby a line may be attached to the outer end of the securing wire.

7. The combination with a fish bait comprising a fish hook having its shank extending through an aperture in a resilient bait body and an eye carried by said shank adjacent the outer end of the bait body, of means for securing said shank to said bait body, said means comprising a wire extending through the aperture, a wrapping extending around said wire and shank, said wire extending through the eye of the shank, an angularly disposed portion carried by one end of said wire and disposed in a slot in the inner end of the bait body, said wrapping terminating in a portion extending over the outer end of the bait body and forming a hook guard.

In testimony whereof I affix my signature.

BENJAMIN H. WINCHELL.